Oct. 24, 1933.   F. A. NAUTS   1,932,251
CHILD'S VELOCIPEDE
Filed May 6, 1931   2 Sheets-Sheet 1
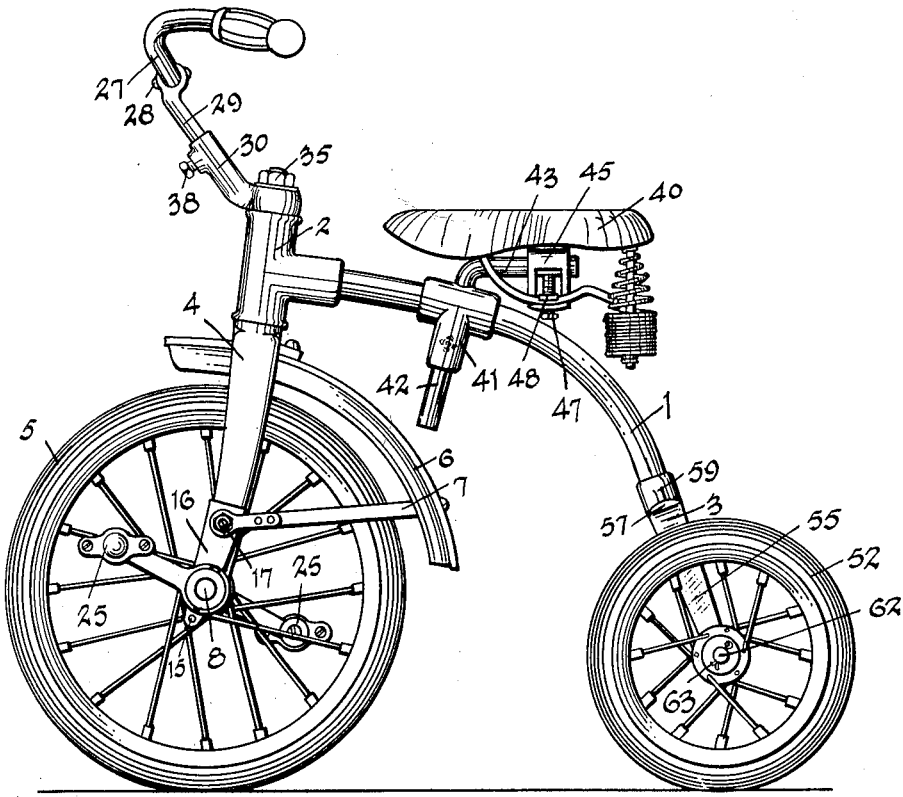
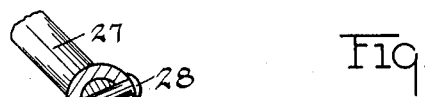
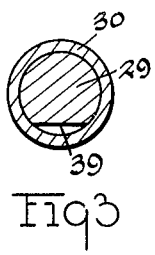
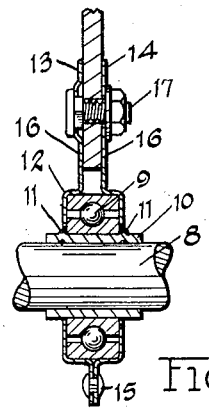
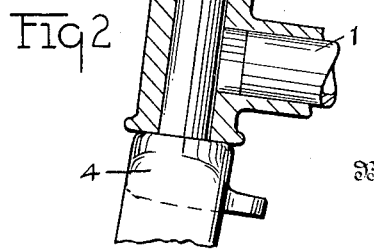
Inventor
Frank A. Nauts Oct. 24, 1933.  F. A. NAUTS  1,932,251
CHILD'S VELOCIPEDE
Filed May 6, 1931  2 Sheets-Sheet 2
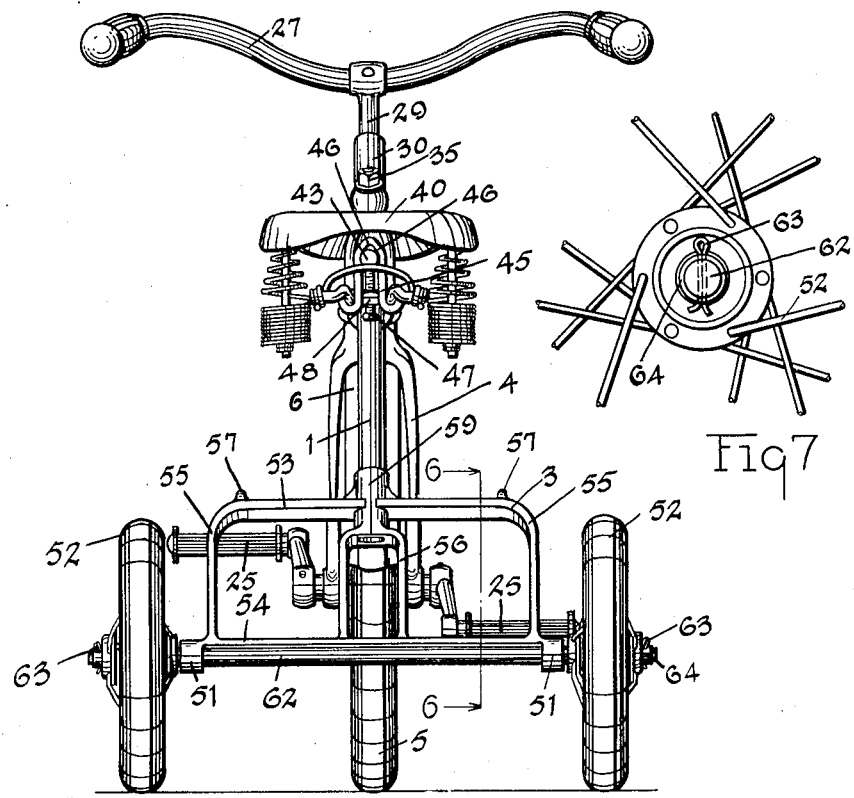
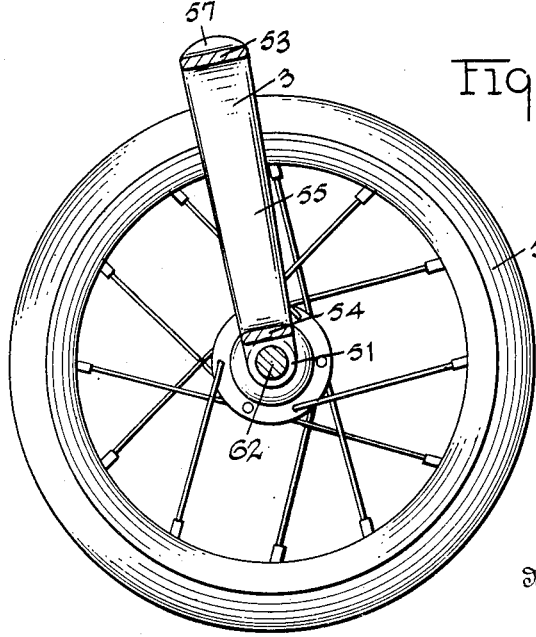
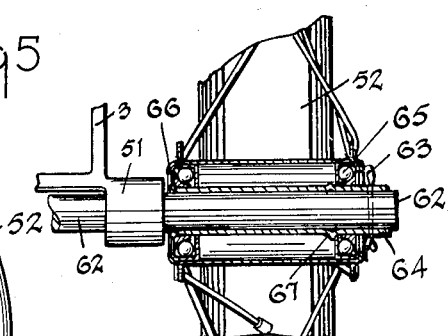
Inventor
Frank A. Nauts
By
Attorney Patented Oct. 24, 1933

1,932,251

UNITED STATES PATENT OFFICE 1,932,251

CHILD'S VELOCIPEDE

Frank A. Nauts, Toledo, Ohio, assignor to The Monarch Products Co., Tiffin, Ohio, a corporation of Ohio Application May 6, 1931. Serial No. 535,408

4 Claims. (Cl. 208—115)

My invention has for its object to provide an efficient child's velocipede that is so formed that it may be readily adjusted to provide for children of different sizes or ages, and also for the increasing size of the child as it grows older. Thus the utility period of the velocipede to the child is greatly increased. The invention also particularly provides convenient steps to enable the child to readily seat himself on the velocipede. The invention also provides means for adjustment of the handle bar and saddle to accommodate the length of the child's arms and position of the knees and the length of the trunk of his body as he increases in size.

The invention also provides a construction wherein projecting parts are avoided that might otherwise strike the child or interfere with the handling of the velocipede by the child.

The invention consists of other features and advantages which will appear from the following description and upon examination of the drawings. Structures containing the invention may partake of different forms and may be varied in their details and still embody the invention. To illustrate a practical application of the invention, I have selected a child's velocipede embodying the invention as an example of the various structures and the details of such structures that contain the invention, and shall describe the selected structure hereinafter, it being understood that variations may be made and that certain features of my invention may be used to advantage without a corresponding use of other features of the invention and without departing from the spirit thereof. The particular structure selected is shown in the accompanying drawings.

Fig. 1 is a side view of the velocipede. Fig. 2 is a view of a section of the cross bar supporting and adjusting parts of the velocipede. Fig. 3 illustrates a view of a section taken on the plane of the line 3—3 indicated in Fig. 2. Fig. 4 illustrates the ball bearings for the front wheel. Fig. 5 is a rear view of the velocipede. Fig. 6 illustrates a view of a section of a part of the supporting frame. It illustrates a view taken on the plane of the line 6—6 indicated in Fig. 5. Fig. 7 illustrates an enlarged end view of the hub of one of the rear wheels. Fig. 8 illustrates a broken view of one of the rear wheels and a section of the hub.

The frame comprises a bowed tubular member 1 that is secured to the tubular T-shaped head 2 and the step frame 3. A fork 4 is supported in the head 2 and is provided with a front wheel 5. The front wheel 5 is located between the arms of the fork in the manner well known in the art. Also, a suitable guard 6 may be supported over the wheel 5 and within the confines of the upper end of the fork 4. The wheel guard 6 is connected to the arms of the fork by means of the rods 7.

The wheel 5 is connected to an axle 8 which is located in ball bearings 9 that are connected to the ends of the arms of the fork 4. The axle 8 is fitted into a sleeve 10. The sleeve 10 is provided with raised bosses 11 which secure the ball bearings 9 in position with reference to the sleeve 10. The ball bearings 9 are enclosed in the housings 12. Each housing 12 consists of a pair of cupped plates 13 and 14 that are secured to an arm of the fork 4. The ball bearings 9 are located within the cupped parts of the plates 13 and 14 and afford a rotatable support of the axle 8 with respect to the ends of the arms of the fork 4. Each pair of cupped plates are secured together on one side by means of a rivet 15. The plates are extended and are provided with channeled portions 16 which surround the lower end of each arm of the fork 4. The plates are secured to the lower end of each arm of the fork by means of the bolt and nut 17 which thereby secures the ball bearing 9 in definite relation with respect to the arm of the fork 4 and provides a convenient means for readily assembling the bearing parts of the velocipede.

The pedals 25 are connected to the ends of the shaft 8, in any suitable manner, in order to produce rotation of the wheel 5 by the operation of the pedals 25 which motivates the velocipede.

Movement of the velocipede is directed by angular movements of the fork 4 produced by the handle bar 27 which is connected to the upper end of the fork 4. The handle bar 27 is connected to a pair of telescoping parts 29 and 30. The handle bar 27 extends through the part 29 and is secured thereto by means of a pin 28. The fork 4 has a stem 31 that extends through the head 2 and is rotatably supported therein. Its upper end may be squared or hexed, as at 32, and the telescoping part 30 may be provided with a corresponding female square or hexed socket to receive the end part 32 of the stem 31. Preferably the part 30 is provided with a boss 33 through which the hexed or squared end of the stem 31 extends and the thickness of the boss 33 is substantially the same as the length of the hexed or squared part of the stem 31. The stud 31 terminates in a threaded end 34. To securely connect the part 30 to the fork 4, the part 30 is placed over the squared or hexed end 32 of the stud 31 and is then secured by means of the nut 35 and the washer 36 which provides for free movement of the fork 4 within the head 2 and yet secures the parts together in a manner to prevent any injury to the child and without the use of any projecting part.

The telescoping parts 29 and 30 are located at an angle to the axis of the head 2 and the stud 31 and so as to be inclined upwardly and away from the axis of the stem 31. Also, the telescoping parts 29 and 30 may be adjustably secured relative to each other by means of the set screw 38 which is threaded in through the wall of the female member 30 of the telescoping parts and engages, preferably, a flattened surface 39 of the axle member 29 of the telescoping parts. Thus, as the child grows older, the parts 29 and 30 may be adjusted for the increased length of the torso of the child and also the increased length of the arms of the child. The handle bar may be raised and moved forward by the adjustment of the telescoping parts which provides ample room for the knees of the child when operating the pedals 25 and displaces the handles of the handle bar forwardly from the saddle.

The saddle 40 is supported on the tubular bowed member 1. Preferably the bowed member extends through a T-shaped reinforcing part 41 and a bent rod 42 extends through the T-shaped member 41, the rod 42 being provided with a substantially horizontal part 43 on which the saddle 40 is supported and upon which the saddle 40 may be horizontally adjusted for varying the position of the saddle with respect to the handle bar 27 and the pedals 25. The saddle 40 is provided with an inverted V-shaped broad clamping member 45 having flat sides 46 that are adapted to engage the cylindrical surface of the part 43 of the rod 42 along two lines extending across the flat portions 46 of the inverted V-shaped clamping member. A set screw 47 extends through a member 48 that engages parts of the frame of the saddle. The set screw 47 extends towards the inner sides of the inverted V-shaped clamping member 45 and operates to clamp the part 43 of the rod 42 against the flat surfaces of the parts 46, and thus locks the saddle in its adjusted position along the part 43. The extended length of the line contact prevents forward or rearward tilting of the saddle and the two line contacts of the member 45 with the one point contact of the set screw 47 prevent twisting of the saddle and yet the construction provides for clamping saddles in position on rods of different sizes.

The step frame 3 is also connected to the tubular bowed member 1. The step frame forms a means for connecting the rear wheels 52 to the vehicle and provides a convenient means that enables the child to mount the vehicle. The step frame 3 has a pair of flat bars 53 and 54 that may be formed integrally with the shaft connecting members 51. The flat cross bars 53 and 54 afford a pair of steps on which the child, who uses the vehicle, may step and use in seating himself on the saddle 40. The use of the steps 53 and 54 will also depend upon the size of the child. A smaller child will use both the steps 53 and 54, while a larger child will only use the step 54. The frame thus constitutes a double step frame that enables convenient use of the velocipede for children of different ages. The step frame 3 is provided with uprights 55 and 56 which confine the feet of the user within the space between the uprights 55 and 56 of the cross bar 54, and the frame 3 is also provided with a pair of lugs 57 that confine the feet between the bowed tubular frame member 1 and the lugs 57, when the upper step 53 is used. The uprights 55 and 56, particularly 56, afford a means for greatly strengthening the step frame. The uprights 56 and parts of the cross bar 53 are integrally connected with the socket member 59 in which the lower end of the tubular bowed member 1 is secured. The uprights 56 are integrally connected to the lower end of the socket member 59 and to the lower cross bar 54. The step frame 3 also provides a means for carrying a passenger who might ride by standing on either one of the steps of the frame. The step frame thus affords an exceedingly rigid, as well as a very convenient, construction for carrying a passenger, and as an aid to the child in being seated on the saddle.

The shaft connecting members 51 depend from the step frame 3 and the shaft 62 extends through and tightly fits the shaft connecting members 51. This locates the shaft 62 below and contiguous to the lower step 54. The shaft 62 is usually made of steel that will bend if too heavy a weight is placed thereon and, consequently, the shaft 62 is protected by the lower step 54 of the step frame 3. The wheels 52 are provided with suitable ball bearings located on sleeves 64. The ball bearings 65 have the usual cones and cups, the cones being secured to the sleeves and the cups being held in position by the barrels of the wheels. The sleeves are provided with flared edges 66 and raised beads or protuberances 67. The shaft 62 may then be readily slipped into place in the sleeves and secured by any suitable means. In the form shown cotterpins 63 are inserted in the ends of the shaft and the outer ends of the sleeves to secure the wheels 52 in proper relation with respect to the shaft connecting parts 51 of the frame. This provides an easy means for assembling the rear wheels 52 and the shaft 62 of the vehicle.

I have thus provided an exceedingly simple velocipede and yet one which provides for the pleasure of a child over a number of years, by reason of the adjustability and adaptability of parts of the velocipede. The invention provides an exceedingly rigid construction having parts that may be readily assembled. Hence the parts may be packed in a container of small volume for shipping purposes and the velocipede may be readily assembled upon its arrival at the destination to which it is shipped.

I claim:

1. In a child's velocipede, a frame, a steering front wheel fork, a head connected to the frame for pivotally supporting the fork, a pair of self-contained telescoping members connected to the fork, the telescoping members extending in a direction inclined to the axis of rotation of the fork, means for adjustably securing the telescoping members relative to each other and within limitations of their body dimensions, and a handle bar secured in one of the telescoping members for operating the fork and the front wheel of the vehicle.

2. In a child's velocipede, a frame, a saddle supported on the frame, a steering front wheel fork, a head connected to the frame for pivotally supporting the fork, a pair of self-contained telescoping members, one of the members connected to the fork, a handle bar secured in the other of the telescoping members, means for adjustably securing the telescoping members relative to each other and within limitations of their body dimensions, the telescoping members extending from the upper end of the head and in a direction inclined to the axis of rotation of the fork and away from the saddle and upwardly above the head.

3. In a child's velocipede, a frame, a steering front wheel fork, a head connected to the frame for pivotally supporting the fork, a member connected to the fork and having a socket, a handle bar, a second member connected to the handle bar and having a socketing portion adapted to be slidably received within the said socket, means for holding the socketing portion in adjustable positions within the socket, both of the said members extending, when in socketed position, from the upper end of the head and in a direction inclined to the axis of rotation of the fork.

4. In a child's velocipede, a frame, a saddle supported on the frame, a steering front wheel fork, a head connected to the frame for pivotally supporting the fork, a member connected to the fork and having a socket therein, a second member having a socketing portion adapted to be slidably supported in the said socket, a handle bar connected to the second named member, means for adjustably securing the second named member relative to the first named member within the limitations of the said socket, the first named and second named members extending, when in socketed relation, from the upper end of the head and in a direction inclined to the axis of rotation of the fork and away from the saddle upwardly above the head.

FRANK A. NAUTS.